United States Patent
Richard et al.

(10) Patent No.: US 9,403,477 B2
(45) Date of Patent: Aug. 2, 2016

(54) LUMINOUS GLAZING UNIT FOR VEHICLE, INCLUDING A PERIPHERAL LIGHT SOURCE, MANUFACTURE THEREOF

(75) Inventors: Alexandre Richard, Paris (FR); Bastien Grandgirard, Marqueglise (FR); Adèle Verrat-Debailleul, Villers-sur-Coudun (FR); Christophe Kleo, Attichy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 213 days.

(21) Appl. No.: 14/236,032

(22) PCT Filed: Jul. 30, 2012

(86) PCT No.: PCT/FR2012/051793
§ 371 (c)(1),
(2), (4) Date: Apr. 2, 2014

(87) PCT Pub. No.: WO2013/017791
PCT Pub. Date: Feb. 7, 2013

(65) Prior Publication Data
US 2014/0240998 A1 Aug. 28, 2014

(30) Foreign Application Priority Data

Jul. 29, 2011 (FR) .................................... 11 57012

(51) Int. Cl.
*B60Q 3/02* (2006.01)
*B32B 17/10* (2006.01)
(Continued)

(52) U.S. Cl.
CPC ........ *B60Q 3/0213* (2013.01); *B32B 17/10018* (2013.01); *B32B 17/10541* (2013.01);
(Continued)

(58) Field of Classification Search
CPC . B32B 17/10541; B60Q 1/268; B60Q 3/0213
See application file for complete search history.

(56) References Cited

U.S. PATENT DOCUMENTS

| 4,960,631 | A | * | 10/1990 | Walters | ............. B32B 17/10302 296/84.1 |
| 6,536,930 | B1 | | 3/2003 | Hirmer | |
| 7,284,886 | B2 | * | 10/2007 | Chen | .................... B60Q 3/0213 362/488 |
| 8,829,539 | B2 | * | 9/2014 | Kleo | ................. B32B 17/10018 257/82 |

(Continued)

FOREIGN PATENT DOCUMENTS

| DE | 103 23 715 | 4/2004 |
| EP | 1 234 752 | 8/2002 |

(Continued)

OTHER PUBLICATIONS

International Search Report as issued for International Application No. PCT/FR2012/051793, dated Dec. 21, 2012.

*Primary Examiner* — Robert May
(74) *Attorney, Agent, or Firm* — Pillsbury Winthrop Shaw Pittman LLP (57) ABSTRACT

A luminous glazing unit for a vehicle, includes a first pane of mineral or organic glass having a first main face, a second main face and a side face, a diode support, diodes facing an edge of the second face of the first pane, referred to as the injection face, a device for extracting the guided light, a cap covering the diodes, which is leaktight against one or more fluids, in particular liquid water or water vapor, the cap is facial, facing the second face, and is associated with an interfacial element for interfacial sealing against the one or more fluids, and/or the diode support at least is provided with at least one moisture protection layer and/or an encapsulation such as a varnish of the silicone, epoxy or acrylic type.

27 Claims, 3 Drawing Sheets

(51) Int. Cl.
*F21S 8/10* (2006.01)
*F21V 8/00* (2006.01)
*B60Q 1/26* (2006.01)
*F21V 31/00* (2006.01)
*F21W 101/00* (2006.01)
*F21Y 101/02* (2006.01)
*F21Y 105/00* (2016.01)

(52) U.S. Cl.
CPC ............ *B60Q1/268* (2013.01); *F21S 48/2225* (2013.01); *F21S 48/2243* (2013.01); *G02B 6/0095* (2013.01); *B32B 2369/00* (2013.01); *F21V 31/005* (2013.01); *F21W 2101/00* (2013.01); *F21Y 2101/02* (2013.01); *F21Y 2105/00* (2013.01); *G02B 6/0083* (2013.01); *G02B 6/0091* (2013.01)

(56) References Cited

U.S. PATENT DOCUMENTS

| | | | |
|---|---|---|---|
| 8,944,655 | B2 * | 2/2015 | Verrat-Debailleul ........ B32B 17/10036 362/545 |
| 2004/0031234 | A1 | 2/2004 | Emde |
| 2010/0073959 | A1 | 3/2010 | Hamada |
| 2014/0240998 | A1 * | 8/2014 | Richard ............ B32B 17/10541 362/510 |

FOREIGN PATENT DOCUMENTS

| | | | |
|---|---|---|---|
| EP | 1 491 835 | 12/2004 | |
| FR | 2 899 852 | 10/2007 | |
| FR | WO 2010049639 A1 * | 5/2010 | .......... B60Q 3/0213 |
| WO | WO 01/90787 | 11/2001 | |
| WO | WO 2006/128941 | 12/2006 | |
| WO | WO 2010/112191 | 10/2010 | |

* cited by examiner

LUMINOUS GLAZING UNIT FOR VEHICLE, INCLUDING A PERIPHERAL LIGHT SOURCE, MANUFACTURE THEREOF

CROSS-REFERENCE TO RELATED APPLICATIONS

This application is the U.S. National Stage of PCT/FR2012/051793, filed Jul. 30, 2012, which in turn claims priority to French Application No. 1157012, filed Jul. 29, 2011. The content of both applications are incorporated herein by reference in their entirety.

The present invention relates to vehicle glazing units, particularly to the luminous glazing units of vehicles, in particular having light-emitting diodes, and to the method for manufacturing such vehicle glazing units.

Vehicles are increasingly making use of light-emitting diodes (LEDs).

Document WO2006128941 proposes, for example, a panoramic roof with homogeneous lighting over the surface by one or more light-emitting diodes. This roof comprises a laminated structure which, as shown in FIG. 8, is composed of an external pane for light extraction, a transparent central pane for light guiding, and an internal pane for scattering the light. The light source is a plurality of light-emitting diodes fitted on a lateral support fixed to the side face of the internal and external panes, while a hole is made in the central pane in order to accommodate the diodes.

The panoramic roof is fixed to the bodywork of the roof by adhesive bonding of the peripheral edges of the external pane. The diodes and the peripheral adhesive bonding region are masked by the internal trim.

The invention proposes to widen the range of available vehicle lighting glazing units.

Specifically, the present invention relates to a luminous glazing unit for a vehicle having an ecological and efficient light source (light-emitting diodes), suitable in particular for any roof configuration, and particularly roofs fitted via the outside to the bodywork roof: opening or closed roofs.

For this purpose, the luminous glazing unit for a vehicle should be durable, compact and robust while remaining simple, thus satisfying the specifications dictated by vehicle manufacturers.

The present invention also relates to a luminous glazing unit for a vehicle which meets industrial requirements (in terms of output, and therefore cost, rate, automation, etc.), thus making "low-cost" production possible without sacrificing performance.

To this end, the invention provides a luminous glazing unit for a vehicle, comprising:

- a first pane of mineral or organic glass having a first main face, a second main face, optionally with an opaque peripheral region if the pane is made of double organic material,) and a side face,
- a peripheral light source which has an emitting face and is formed by light-emitting diodes, each comprising a semiconductor chip on (at least) one profiled section for supporting the diodes, (the profiled assembly and the diodes commonly being referred to as an array of diodes), the emitting face facing an edge of the second face referred to as the injection face (in contact or not with the second face) for propagation of the injected visible and/or ultraviolet, so-called UV, light in the thickness of the first pane, the first pane then acting as a guide for the injected light, (the injection edge optionally being partly recessed in its thickness or with a step),
- means for forming at least one luminous region, such as:
  - means for extracting the guided light via the first and/or second main face, which are scattering means on the surface of the first and/or second main face or scattering means in the volume of the first pane,
  - and/or, when the injected light is (in particular) UV light, means for converting the UV light into visible light via the first and/or second main face, which are luminescent materials in particular on the first and/or second main face (in which case the extraction face),
- an optional attached (and therefore separate from the first pane) peripheral functional element bonded to the first pane (in particular by an internal face, the element having in particular a free external face), which is leaktight against fluid(s), in particular liquid water or water vapor, the functional element being for example adjacent to the injection edge, which functional element is selected from overmolding or a prefitted element (metallic or polymeric), in particular a functional element selected from an encapsulant (flexible, such as PU, for example, or rigid such as PC, in particular black/opaque), an extrudate, a seal, in particular adhesively bonded onto the first pane),
- a cap covering the source, which is leaktight against fluid(s), in particular liquid water or water vapor, the so-called facial cap, that is to say essentially (or entirely) one facing (above) the second face, and which is secured by fastening means
  - to the first pane (preferably by the second face), in particular made of organic glass (double material)
  - and/or to a connecting piece bonded to the first pane, which connecting piece is made of metal or sufficiently rigid plastic, for example black part in polycarbonate on the first pane of transparent polycarbonate or a single-face recessed piece with a closed contour, such as a frame,
  - and optionally to the functional element (by its external face), which is in particular sufficiently rigid,
- the cap and the diode support being removable from the glazing unit (cap and support alone or cap carrying the support),
- the cap having a so-called internal general face oriented toward the second face, in particular on the second face of the first pane, which is for example organic, with black and transparent double material,
- the cap optionally being associated with an interfacial element for interfacial sealing against one or more fluids, in particular liquid water or water vapor, which is arranged between the cap and the connecting piece and/or optionally between the cap and the functional element (with an edge referred to as a bearing edge),
  - or integrated into the cap, or integrated into the connecting piece or integrated into the first pane
  - or between the cap and the glass pane (organic black part, for example),
- and the diode support at least is provided, advantageously before its integration into the glazing unit, with at least one moisture protection layer and/or an encapsulation such as a varnish of the silicone, epoxy or acrylic type.

The present invention thus provides a durable luminous glazing unit, even when the glazing unit is not protected by the bodywork, this being by virtue of the simple and adapted sealing means, eliminating paths for one or more fluids to spread.

The leaktight cap associated with the interfacial sealing is easy to (re)position, and extractable (removable, replaceable with a low cost) if necessary:

in order to change the light source (LEDs, etc.) and/or their electronic driver during repair, or recycling, or else in order to meet new optical performance requirements desired by the client (change of color(s), power, frequency, control) or by new standards applied, and/or in order to add sources (LED and/or optical fiber) and/or electronic drivers in a glazing unit with the recess and such sealing means according to the invention.

The invention thus facilitates modularity of the proposed lighting on the glazing unit (illuminating glazing unit, or capable of becoming such, variation of color, intensity, etc.)—at the logistical management level of the streams in production (early fitting in the warehouse rather than at the request of the client).

The invention reduces the impact of the integration of the source (LED, etc.) on the selection of the methods and materials, and makes it possible not to be dependent on one production technology because it offers a wide range of usable solutions for encapsulation or prefitting.

Furthermore, the solution according to the invention is flexible because the cap can be installed independently of the source (for example the LED array or arrays).

The invention makes it possible to manufacture a luminous glazing unit for a vehicle with an optional functional element attached to the glazing unit in a conventional way, and in particular manufactured according to conventional techniques (extruded, molded, etc.), the functional element being modifiable in a suitable way (recessed) in order to be used as a support for the cap in post-assembly.

In certain configurations, the cap is not visible after fitting on the bodywork of the vehicle.

The support of the diodes at least (or the chips) is provided, advantageously before its integration into the glazing unit (during their manufacture, etc.), with at least one single or multiple layer protecting against moisture and/or an encapsulation such as a varnish of the silicone, epoxy or acrylic type.

This allows easy integration into the housing provided in the glazing unit (integration which does not require complex management of the sealing between the recess and the external environment).

More precisely, the protective layer protects at least a printed circuit, welds, connectors, if they are not leaktight.

The diodes (at least the emitting face) are preferably not protected in this way if they are already covered (pre-encapsulated) with silicone.

The LED arrays are protected before they are integrated into the housing (recess of the functional element, etc.). The protection may be of the protective varnish type (silicone, epoxy, acrylic, etc.), encapsulation or potting of the LED array (silicone, epoxy, acrylic, etc.).

The tropicalization varnishes marketed by Syneo, with an acrylic base, or PU or silicone may be mentioned.

The protective varnish Abchimie may be mentioned. The deposition is by immersion, selective deposition or vaporization (layers of 25-50 microns).

By virtue of the protective layer, perfect sealing between the surface of the cap and the surroundings is no longer indispensable, but may be complementary. The two sealing solutions may thus be combined for greater security, or in order to avoid degradation of the module due to moisture in the air trapped in the cavity once the cap has been fitted.

At the very least, the cap is not necessarily leaktight (against fluids). It preferably protects against ingress of material which would come between the diodes and the injection side face, but does not provide the necessary sealing against moisture and liquid water. The cap may be pierced, for example in order to pass a wire through.

The design of the interface between the cap and the assembly element is thus facilitated, and the manufacturing process of the glazing unit is facilitated.

Furthermore, the cap and the interfacial sealing element according to the invention are useful in particular for protection of the source, in particular the chips, against moisture, in order to avoid contamination of the coupling space (dirt, organic pollution, such as mold, etc.) and preferably against cleaning products, or high-pressure jet washing. This protection must be durable.

In order to qualify the long-term sealing against moisture, the wet cataplasm test may be employed. For example, the standard D47 1165-H7 used in the automotive sector describes the wet cataplasm test H7. This test consists in embedding the piece to be tested in cotton impregnated with demineralized water and enclosing this combination in a hermetic bag, then in placing it in an oven at 70+/−2° C. for seven days. The pieces are then released, have the soaked cotton removed and are placed at 20° C. for 2 hours. The pieces may finally be observed and tested mechanically or functionally in order to evaluate the effect of moisture on the system. This test corresponds to several years of natural ageing in a hot wet environment.

A high-pressure water jet cleaning test may also be used, such as the test of resistance to washing with a D25 5376 high-pressure cleaner used in the automotive sector: pressure up to 100 bar with a nozzle/casing distance of up to 100 mm.

The solution according to the invention, employing a set of means for the sealing, is preferred to total "monolithic" encapsulation, in particular overmolding (encapsulant, etc.) or by coating with glue, adhesive, in which the light source (for example the LED arrays) is entirely encapsulated, i.e. a solution which makes the light source difficult to access without risk of damaging it.

Furthermore, total encapsulation is challenging and may damage the source, in particular the LEDs already fitted (and/or their electronic circuit), leading to significant reject costs, unless precautions which complicate the manufacturing are taken.

Likewise, integration of the source such as an LED array is difficult or even impossible in the case of extrusion or a molded piece, owing to the risk of degrading the luminous function.

In an advantageous embodiment, which is simple to implement, the first pane is made of glass, in particular organic glass, in particular PC, with a blind hole in its thickness from the second face, for example a step, in order to accommodate the source facing the injection edge.

This is because it is easier to form a hole or groove in a pane of organic glass, in particular plastic (PC, etc.), than in a pane made of mineral glass, in particular toughened glass.

In a preferred embodiment, the hole is provided over the entire periphery of the second face and the cap forms a frame, in particular incorporating said fastening means (by screwing or clip fastening, etc.).

The cross section of the cap may then for example be L-shaped or U-shaped, incorporating said fastening means, for example of the screwing, clip fastening, riveting or adhesive bonding type.

The glazing unit comprises an element for masking the source and possible stray light (in particular on the face opposite the extraction face, in proximity to the injection region), and/or for masking the fastening of the glazing unit to the bodywork of the vehicle by the second face, in which case the masking element may be:

a functional element part, in particular a polymeric encapsulation (sufficiently opaque, black), and/or a sufficiently opaque enamel on the periphery of the second face and/or on the first face, or a face of a sheet film attached facing the first face, in particular when the functional element is single-face or double-face, and/or a reflective surface (layer, etc.) on the periphery of the second face and/or on the first face, or an attached face facing the first face.

In particular, the first pane is made of organic transparent and opaque double material, in particular polycarbonate:

the opaque region of the first pane, on the periphery of the second face and/or on the first face, forms masking of the source and possible stray light (in proximity to the injection), and therefore the functional element and/or optionally said piece connecting with the transparent polycarbonate of the first pane, and/or forms masking of the fastening of the glazing unit to the bodywork of the vehicle by the second face, and therefore the functional element and/or optionally said piece connecting with the transparent polycarbonate of the first pane.

Advantageously, the glazing unit may comprise a plurality of sources, in particular groups of said diodes distributed over a plurality of profiled sections (and therefore a plurality of diode arrays), a cap and an interfacial sealing element being provided for each group (array) of diodes, and/or the cap and the interfacial sealing element being common to a plurality of (arrays) groups of diodes.

Preferably, the distance between the internal face of the cap and the first face is less than 10 mm.

Preferably, the distance between the external face of the cap and the injection edge or side face is less than 15 mm. The thickness of the cap may be less than 5 mm.

Furthermore, the space of the radiation emitted before injection, referred to as the coupling space, varies naturally as a function of the radiation diagram of the source, defined by a principal emission direction and an emission cone.

An optionally adhesive material, transparent to said single or multiple radiation, for filling the coupling space may be provided, in particular:

a foam, a thermoplastic resin, an adhesive material of the glue type, in which the chips are embedded and which fixes the chips to the glazing unit, a double-sided adhesive bonded onto the chips and the support by one adhesive face and bonded to the glazing unit by the other adhesive face.

As adhesive materials (polymers, etc.), fulfilling if necessary a short-term sealing function, the following may be mentioned:

a UV crosslinkable adhesive, a tape (acrylic, PU, etc.) rendered adhesive with acrylic adhesive, a transparent adhesive, PU, silicone, acrylic, a thermoplastic resin: polyvinyl butyral (PVB), ethylene/vinyl acetate (EVA) copolymer, etc.

Nevertheless, the invention makes it possible to avoid the addition of an extra material as mentioned above (filling and/or adhesive material and/or sealing material) for carrying out the optical coupling between the LEDs (bare or pre-encapsulated) and the glazing unit. Such elements entail additional cost and are liable to modify the color of the light.

It is preferred for the space of the radiation emitted before injection, referred to as the coupling space, to be gaseous (one or more gases, for example air) and/or the element for interfacial sealing against one or more fluids, which is local, to be at the periphery of the internal face of the cap or on one side of the cap, the element for interfacial sealing against one or more fluids forming in particular a bead.

The diodes may be (pre-)encapsulated, that is to say comprising a semiconductor chip and a package, for example made of resin of the epoxy type or made of PMMA, encapsulating the chip and having multiple functions: scattering or focusing element, wavelength conversion. The package is common or individual.

The diodes may preferably be simple semiconductor chips, for example with a size of the order of one hundred μm or one mm.

The diodes may optionally comprise a protective package (optionally temporary) in order to protect the chip during handling or in order to improve compatibility between the materials of the chip and other materials.

The diode may be selected in particular from among at least one of the following light-emitting diodes:

a side-emitting diode, that is to say one emitting parallel to the (faces of) electrical contacts, with an emitting face which is lateral with respect to the support, the support being for example facial (parallel to the pane) like the cap, a diode whose principal emission direction is perpendicular or oblique with respect to the emitting face of the chip.

The emission diagram of a source may be Lambertian.

The glazing unit may thus integrate all functionalities known in the field of glazing units. Among the functionalities added to the glazing unit, the following may be mentioned: hydrophobic/oleophobic layer, hydrophilic/oleophilic layer, photocatalytic anti-soiling layer, stack reflecting thermal radiation (solar control) or infrared radiation (low-emission), antireflection.

The profiled support section may be a conventional PCB or may be metallic. The profiled support section may have a rectangular cross section.

The total number of diodes and the power of the diodes are selected as a function of the size and the location of the regions to be illuminated, the desired luminous intensity and the required light homogeneity.

The length of the profiled support section varies as a function of the number of diodes and the extent of the surface to be illuminated.

The profiled LED support section has a length of the order of 20 cm, for example. The number of LED arrays (profiled section+LEDs) is preferably increased in order to cover the surface.

For greater compactness and/or simplified design, the profiled support section may furthermore have one or both of the following characteristics:

it is thin, in particular with a thickness of less than or equal to 1 mm, or even than 0.1 mm, it has a metallic surface coating for electrical conduction.

A plurality of profiled support sections with identical or similar diodes may be provided instead of a single profiled support section, particularly if the regions to be illuminated are very far apart from one another, or in order to illuminate a large region.

It is possible to provide a profiled support section having a given reference size, the number of which is increased as a function of the size of the glazing unit and the requirements.

For greater compactness and/or in order to increase the clear window region, the distance between the part carrying the chips and the first pane is preferably less than or equal to 5 mm, the distance between the chips and the first pane preferably being less than or equal to 2 mm.

The fastening of the source to the glazing unit may also be carried out outside the coupling space, in particular outside the injection edge, and for the diodes by the fastening of the profiled support section, in particular by gluing or double-sided adhesive bonding or clip fastening, onto one of the faces of the first pane, in particular the second face, and/or onto the internal face of the cap.

As "permanent" means for fastening the support to the cap, adhesive bonding, welding, or riveting may be selected, depending on the type of piece.

In order to facilitate removal or replacement of the cap, the interfacial sealing element, preferably at the periphery of the cap, is a reversible adhesive or hook-and-loop fastener, forming part of or constituting said means for fastening the cap, which are then reversible, preferably a bead of adhesive arranged in a bead, in particular in contact with the internal face of the cap or with the connecting piece (via its free external face) or the second face, in particular an adhesive of the dual component epoxy type.

As a reversible adhesive, mention may be made of epoxies, in particular dual component epoxies, for example the products of the ElectRelease™ range from the company EIC Laboratories.

In order to facilitate removal and refitting, the interfacial sealing element, preferably at the periphery of the cap, is a compressed material, the sealing by compression of the material being carried out by a closure force of said means for fastening the cap, the interfacial sealing element being selected in particular from among:
- a polymeric seal, for example made of TPE, EPDM, in particular an O-ring seal, having one or more sealing lips, the seal lying particularly in a groove of the cap (on the internal face of the cap or in a groove on one side of the cap) or of the second face or of the connecting piece,
- a profiled sealing section on the connecting piece, selected to be polymeric, for example having one or more lips, in particular made of EPDM, or on the internal face or on one side of the cap, which is selected to be polymeric,
- a foam, optionally adhesively bonded (to the cap, to the connecting piece or to the second face), in particular acrylic foam or made of PU, rubber (EPDM, etc.), thermoplastic elastomers, TPE, polyester, in particular single-component polyester rubber such as the product Dynafoam marketed by the company Saint-Gobain Performance Plastics.

The use of sealing adhesive can thus be obviated.

In a first advantageous embodiment, preferably in conjunction with sealing by compression, the means for fastening the cap are reversible, the fastening means being selected from among:
- clip-fastening means of the point type (lugs, etc.) or extended type (that to say extending over the entire length of the cap), arranged on the cap (internal face, etc.), preferably forming an integral part of the cap (preferably in the sealing region defined by the interfacial sealing element), and in particular received for the clip fastening in one or more reception regions in the first pane, which is in particular organic, and/or of the connecting piece and optionally furthermore received in the functional element;
- clip-fastening means of the hook type, forming an integral part of the cap, preferably outside in the sealing region, and in particular received in one or more reception regions of the first pane, which is in particular organic, and/or of the connecting piece, and optionally furthermore received in the functional element;
- screwing means (such as screws, rivets), for example extending beyond the internal face (for example accommodated in perforations of the cap or forming an integral part of the facial cap, optionally via blind holes), preferably in the sealing region, between the interfacial sealing element and the edge of the recess.

The use of fastening adhesive can thus be obviated.

The connecting piece may form a single-face recessed piece with a closed contour, such as a frame.

The cap may be a piece with a substantially planar overall shape. The cap may be an ornamentation (in particular of the color of the bodywork of the vehicle) or be masked after the glazing unit is fastened to the bodywork, the cap being for example along an edge or forming a frame.

The cap may furthermore comprise means for holding said profiled section and/or a recess for passage of the connection means and/or means for positioning the profiled section for supporting the diodes (for example grooves, local stops, etc., studs).

The cap may furthermore comprise:
- the optional integration of electrical supply wires and connections (for example from one diode array to another) prior to the integration of the diodes (overmolding of the wires or provision of grooves, etc.),
- facilitation of lead-out of the wires in relation to connectors of the main supply (which may be the battery, a photovoltaic source, etc.) in the capping region by means of an integrated pin.

Preferably, the transmission factor of the first pane around the radiation peak of the chips (perpendicularly to the main faces) is greater than or equal to 50%, even more preferably greater than or equal to 70%, and even greater than or equal to 80%.

The glazing unit may have a so-called protective layer (a sheet, a film, a deposit, etc.) on one of the first or second faces or extending over said face. This layer may have a double function:
- scattering light (for example a flexible film of PU, PE, silicone, optionally adhesively bonded by acrylic),
- protection against radiation (IR, UV): solar control, low emissivity, etc.,
- scratch-resistant,
- esthetic (tinted, with patterns, etc.).

Rounded edges may preferably be provided for the coupling edge or edges of the first pane. Particularly in the case in which the emitted radiation space is air, it is possible to make use of the refraction at the interface of the air with the first pane with a suitable geometry (rounded edge, or even beveled, etc.) thus making it possible to focus the rays into the first pane.

Optionally, the glass may have previously undergone a heat treatment such as hardening, annealing, tempering, curving.

The glazing unit is a single-glazing unit, the first pane being made of mineral or organic glass, in particular PC, PMMA, PU, ionomeric resin, polyolefin, optionally double material.

The glazing unit may be laminated (a plurality of panes), formed by:
- a thick or thin transparent first pane, mineral glass (float, etc.) or organic glass (PC, PMMA, PU, ionomeric resin, polyolefin),
- a lamination intermediate made of given lamination material,
- a second pane (opaque or not, transparent, tinted, made of mineral glass or organic glass with various functionalities: solar control, etc.).

As a conventional lamination intermediate, mention may be made of flexibly used PU, a thermoplastic without a plasticizer, such as ethylene/vinyl acetate copolymer (EVA), polyvinyl butyral (PVB). These plastics have for example a thickness of between 0.2 mm and 1.1 mm, in particular 0.38 and 0.76 mm.

The following may be selected in particular as the first pane/intermediate/second pane:
mineral glass/intermediate/mineral glass,
mineral glass/intermediate/polycarbonate,
polycarbonate (optionally thick)/intermediate/mineral glass.

In the present description, unless otherwise specified, a glass is intended to mean a mineral glass.

The edge of the first pane of a single-glazing unit or laminated glazing unit or double-glazing unit may be cut (trimming with recesses before tempering) in order to accommodate the diodes therein.

The first and/or second panes may be of any shape (rectangular, square, round, oval, etc.) and may be planar or curved.

The first pane may preferably be made of soda-lime glass, for example PLANILUX glass from the company SAINT-GOBAIN GLASS.

The second pane may be colored, for example made of VENUS glass from the company SAINT-GOBAIN GLASS.

The laminated glazing unit comprises a second pane, in particular made of mineral or organic glass, laminated by a lamination intermediate to the first pane, and the side face of the first pane preferably comprises a marginal recess extending into the thickness, in which the source is accommodated, or the second pane extends beyond the injection edge of the first pane, creating a lateral step of the glazing unit.

The glazing unit may be a multiple glazing unit with an insulator or vacuum, in particular a double- or triple-glazing unit formed by:
a thick or thin transparent first pane, mineral glass (float, etc.) or organic glass (PC, PMMA, PU, ionomeric resin, polyolefin),
a second pane (opaque or transparent, tinted, made of mineral glass or organic glass with various functionalities: solar control, etc.) separated by a layer of gas (air or inert gas),
an optional third pane (opaque or transparent, tinted, made of mineral glass or organic glass with various functionalities: solar control, etc.) separated by a layer of gas (air or inert gas).

The glazing unit is a multiple glazing unit, in particular a laminated glazing unit, a vacuum or insulator double-glazing unit, or a triple-glazing unit, the first pane being an external or central pane of the triple-glazing unit.

For extraction of the light, use is made of the scattering means formed either by a surface treatment of the glass pane such as sandblasting, acid attack, deposition of enamel or scattering paste, or by a treatment in the bulk of the glass, such as laser etching.

The scattering layer may be composed of elements containing particles and a binder, the binder making it possible to aggregate the particles together. The particles may be metallic or metal oxides, the size of the particles may lie between 50 nm and 1 µm, and the binder may preferably be inorganic for resistance to heat.

In a preferred embodiment, the scattering layer consists of particles aggregated in a binder, said particles having an average diameter of between 0.3 and 2 microns, said binder being in a proportion of between 10 and 40% by volume and the particles forming aggregates whose size lies between 0.5 and 5 microns. This preferred scattering layer is described in particular in the application WO0190787.

The particles may be selected from among semitransparent particles, and preferably inorganic particles such as oxides, nitrides and carbides. The particles will preferably be selected from among the oxides of silicon, aluminum, zirconium, titanium, cerium, or a mixture of at least two of these oxides.

For example, an inorganic scattering layer of about 10 µm is selected.

For greater compactness and/or in order to reduce or increase the clear window region, the distance between the emitting face and the first pane may be less than 2 mm. In particular, diodes of small size may be used, for example chips without a lens and/or without pre-encapsulation, in particular with a width of the order of 1 mm, a length of the order of 2.8 mm and a height of the order of 1.5 mm.

The optional functional element may have one or more of the functionalities which are standard for a vehicle glazing unit.

The functionality (single or multiple) of the functional element may be one or all of the following:
frame of the glazing unit (single-face, double-face or triple-face), in particular with a width on the first face of from 3 to 100 mm, and with a thickness of from 10 to 40 mm,
and/or
a piece carrying elements for fastening or centering (that is to say for good positioning of the glazing unit on the bodywork of the vehicle during fitting of the glazing unit at the manufacturer),
piece sealing against one or more fluids (liquid water, water vapor, cleaning products, etc.) between the glazing unit and the bodywork of the vehicle, at least limiting passage of the fluids between the glazing unit and the bodywork of the vehicle,
opaque and/or masking piece
and/or
piece (in point form) for holding mechanical elements (side window holder, etc.).

The peripheral functional element is connected to the first pane. The functional element may be an encapsulant, an extrudate, a prefitted seal (window seal), a molded, injection-molded piece, etc.

The functional element lies on the first pane directly or indirectly, for example via an element for reinforcement, bonding.

The functional element may thus be connected to the glazing unit by any means:
direct adhesion of the material (molded, etc.),
pinching or clamping,
connection means such as adhesive bonding, etc.

The functional element may be single-face, that is to say only:
on the second face,
on the side face of the first pane, in the case of a laminated glazing unit or a double- or triple-glazing unit (especially in buses and in the railroad sector, or for aircraft) over all or part of the side face of the glazing unit.

The functional element may be:
double-face: on the second face and on the side face or on the first face and on the side face,
or three-face: on the first face, on the side face of at least the first pane (or of the glazing unit) and on the second face of the first pane.

The functional element on the second face may be used to mask the source and even stray light.

The luminous glazing unit for a vehicle thus comprises an overmolded polymeric functional element, preferably between the encapsulation and the glazing unit, which is made in particular of mineral glass, a single-, two- or three-component primer layer, for example based on polyurethanes, polyester, polyvinyl acetate, isocyanate.

As seen above, the functional element may be a polymeric encapsulation, in particular with a thickness of from 0.5 mm to several cm, obtained by overmolding.

In vehicle applications, the encapsulation material is generally black or colored (for esthetic and/or masking purposes). The encapsulation may be made of polyurethane, in particular RIM-PU (Reaction Injection Molding). Other overmolding materials are:
- flexible thermoplastics:
  - thermoplastic elastomers (TPE), in particular components based on styrene ethylene butadiene styrene SEBS/polypropylene (PP), thermoplastic TPU, polypropylene PP/EPDM,
  - polyvinyl chloride (PVC), ethylene propylene diene terpolymer (EPDM),
- rigid thermoplastics:
  - polycarbonate (PC), polymethyl methacrylate (PMMA), polyethylene (PE), polypropylene (PP), polyamide (PA66), acrylonitrile butadiene styrene (ABS) and ABS-PC blends thereof, polystyrene (PS), acrylonitrile styrene acrylate (ASA).

The overmolding material may be colored, filled with glass fibers.

The single-, two- or three-component primer layer is based, for example, on polyurethane, polyester, polyvinyl acetate, isocyanate, etc., for example with a thickness of from 5 to 50 μm, between the encapsulation and the glazing unit, which is made in particular of mineral glass because this layer promotes adhesion to a mineral glass.

The (overmolded) functional element also adds good esthetic finishing and makes it possible to integrate other elements or functions:
- overmolding of frames,
- inserts for reinforcement or inserts for fastening the glazing unit, in particular for glazing units which open,
- profiled sealing section with multiple lips (double, triple, etc.) which is compressed after fitting on the bodywork,
- ornamentation.

The overmolded functional element may be of any shape, with or without a lip.

Tubing, in other words a profiled sealing section with closed cells, may also be attached to the overmolded functional element.

For a roof, encapsulation is preferably carried out flush, that is to say contiguous with one of the faces of the glazing unit, preferably the second face.

The luminous glazing unit for a vehicle may comprise a functional element which is a single-face piece on the second face, in particular an overmolding or an adhesively bonded piece (seal, frame), a piece with a support (X) for fastening a vehicle element on the glazing unit, or the glazing unit on a vehicle element, along at least one injection edge or at least two opposite edges of the glazing unit.

The functional element may be a polymeric seal, preferably made of elastomer, in particular TPE (thermoplastic elastomer) or EPDM, with a thickness of a few mm (typically between 2 and 15 mm).

The seal may be adhesively bonded in order to hold it. The seal may preferably be held simply by pinching or clamping or by clip fastening (for example 2 half-frames). The seal may be single-face, double-face or triple-face. The seal may form a frame. The seal may be of any shape: L-shaped, U-shaped, etc. The seal may be removable at any time. It may function by one or more lips put under stress after fastening.

The functional element may be metallic or polymeric, polypropylene (PP), polyamide (PA66), polybutylene terephthalate (PBT), etc., optionally filled with glass fibers.

The luminous region or regions (in particular peripheral along an edge of the glazing unit, or opposite or adjacent edges, in one or more strips, framing the glazing unit) form internal ambient lighting, internal reading lighting via a side window, roof, etc.), or a luminous display for internal and/or external signaling.

The luminous region or regions are in particular peripheral, in one or more strips framing the glazing unit.

The extraction/conversion, of the radiation (as well as the type and/or position and/or number of the diodes) are adjusted for:
- ambient or reading lighting, in particular visible inside the vehicle,
- luminous signaling, in particular visible outside:
  - by remote-control activation: detection of the vehicle in a parking lot or the like, door (un)locking indicator, or safety signaling, for example tail braking lights,
- substantially homogeneous illumination over the entire extraction surface (one or more extraction regions, common or separate function).

The light may be:
- continuous and/or intermittent,
- monochromatic and/or polychromatic.

When visible inside the vehicle, it may thus have a function of night lighting or displaying information of any type, such as a drawing, logo, alphanumeric symbol or other signaling means.

As decorative patterns, one or more luminous bands, or a peripheral luminous frame, may for example be formed.

It is possible to produce a single extraction face (preferably internal to the vehicle).

The insertion of diodes into these glazing units permits the following other signaling functionalities:
- display of luminous signaling indicators intended for the driver of the vehicle or the passengers (for example engine temperature warning signal in the automobile windshield, indicator of activation of the electrical deicing system, the windows, etc.),
- display of luminous signaling indicators intended for persons outside the vehicle (example: indicator of activation of the alarm of the vehicle in the side windows),
- luminous display on the glazing units of the vehicles (for example flashing luminous display on emergency vehicles, safety display with low electrical consumption signaling the presence of a vehicle in danger).

The glazing unit may comprise a diode receiving control signals, particularly in the infrared range, for remote control of the diodes.

The glazing unit is intended to be fitted to any vehicle:
- side window of a land vehicle, in particular automobile, utility vehicle, truck, train, in particular with the functional element being a piece for holding a window winder or with the ornamentation cap,
- retractable or fixed roof of a land vehicle, in particular automobile, utility vehicle, truck, train, with an optionally curved first pane, in particular a laminated glazing unit,
- windshield of a land vehicle, in particular automobile, utility vehicle, truck, train, in particular with the luminous region or regions (forming a HUD display for example) in the enamel frame or in proximity thereto, rear window in particular in the enamel frame or in proximity thereto, cabin window or windshield of an aircraft, window panes or roof of an aquatic vehicle, boat, submarine, double- or triple-glazing unit in a train or bus.

Naturally, the invention also relates to a vehicle incorporating the glazing unit as defined above.

Other details and advantageous characteristics of the invention will become apparent on reading the examples of glazing units according to the invention, which are illustrated by the following figures:

FIG. 1b is represents a partial schematic view from above of the luminous glazing unit for a vehicle of the embodiment of the invention in FIG. 1.

It should be pointed out that, for the sake of clarity, the various elements of the objects represented are not necessarily reproduced to scale.

Figure 1:
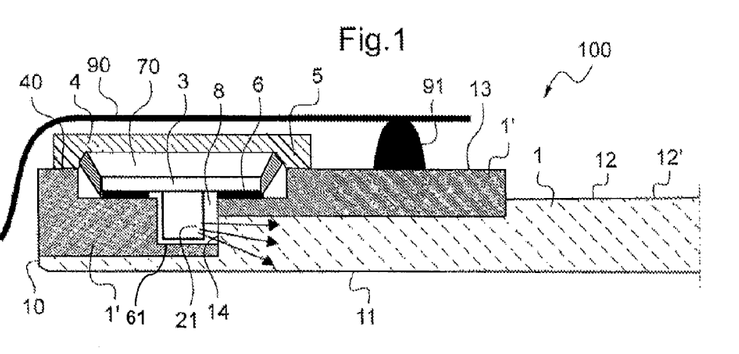
FIGS. 1 to 4 represent partial schematic views in cross section of the luminous glazing units for a vehicle in various embodiments of the invention.

FIG. 1 represents a partial schematic view in section of a luminous glazing unit 100 for a vehicle in a first embodiment of the invention.

This glazing unit 100 is a glazing unit comprising a transparent first pane 1 of organic glass, which is for example rectangular, having a first main face 11 and a second main face 12, and a side face 10, for example a polycarbonate pane of double material, transparent (light guide) and (at the periphery) opaque.

Two profiled sections 3 for supporting light-emitting diodes 2 extend along the e.g. longitudinal border and are fixed at the periphery of the second face 12 of the first glass pane 1, in the recessed opaque region 1', by a hook-and-loop fastener 6 (to be removed). The PCBs are coated with a tropicalization varnish 61.

Each profiled support section 3 is monolithic and thin, with a thickness equal to 0.6 mm (preferably at most 5 mm), a width of 7 mm, and a length of 20 cm. It may be of rectangular cross section, and metallic or a conventional PCB. The bearing length of the profiled section on the second face 12 may typically be less than 7 mm.

As a variant, the profiled diode support section has an L-shaped, U-shaped or J-shaped cross section, etc.

More precisely, the diodes lie in a hole 8 (groove) made in the opaque region 1' of the first pane 1 on the periphery of the second face 12 and the profiled support section 3 bears in a recess 70, which is wider than the groove, in the opaque region 1'.

The opaque region forms masking of the source 2, and extending over the second face masks possible stray light, particularly in proximity to the injection edge 14, and/or forms masking of the fastening 91 of the glazing unit to the bodywork 90 of the vehicle by the second face 12.

The light-emitting diodes each comprise an emitting chip 2 capable of emitting single or multiple radiation in the visible range, which is guided in the first pane 1. The diodes are small, typically with sizes of a few mm or less, in particular of the order of 2×2×1 mm, without optics (lens) and not pre-encapsulated in order to minimize the size, or pre-encapsulated with silicone in order to protect them.

In the configuration illustrated, the emitting face 21 is lateral (normal to the profiled section 3). The distance between the lateral emitting face and the injection edge 14 is reduced as much as possible, for example to 5 mm. The distance between the lateral emitting face and the side face is from 1 to 2 mm. The principal emission direction is perpendicular to the face of the semiconductor chip, for example with an active multiple quantum well layer in the technology of AlInGaP or other semiconductors. The light cone is a cone of the Lambertian type, +/−60°.

The light extraction 12' may take place via the second face 12, which is for example the face inside the vehicle, particularly in the case of a roof.

The extraction 12' is carried out by any scattering means on the surface of the second face 12: sandblasting, acid attack, scattering layer, screen printing, etc., or as a variant by laser etching in the first pane 1.

For a given group of diodes, an emitted radiation space between each diode (chip) and the injection edge of the first pane is defined, referred to as an optical coupling space, which is preferably a gaseous medium, typically air.

Each chip and the emitted radiation space have to be protected against any contamination: water, chemical, etc., both in the long term and during manufacture of the glazing unit 100.

A cap 4 covering the diodes (for example one cap per array) is facial, having a so-called internal general face oriented toward the first face. The cap is a piece of plastic having a planar overall shape, of rectangular contour (with optionally rounded edges). The cap is parallel to the first pane and lies on the opaque region 1', on either side of the recess 70.

In order to reinforce the sealing of each chip, or each diode array, against fluids, the following are furthermore used:

an interfacial element for the interfacial sealing against one or more fluids, arranged between the internal face of the cap and the second face 12 (opaque region 1'), in proximity to the recess 70, this being an EPDM seal 5 in the form of a 5 mm wide bead, in a groove 40 on the first pane (surface 13 of the opaque region 1'), or as a variant on the internal face of the cap.

The cap is secured to the first pane 1 by reversible fastening means, for example two screws (not shown), passing through the cap and extending beyond the internal face.

These screws are received in reception regions of the first pane 1, namely threaded holes, preferably between the seal bead and the edge of the recess 70.

The optional interfacial sealing element 5 is then a compressed material, the sealing by compression of the material being carried out by a closure force of said means for fastening the cap.

The cap is thus easy to remove in order to insert diodes or change them.

As a first variant of the cap, the means for fastening the cap are two clip-fastening means received in reception regions, preferably between the seal bead and the edge of the recess.

As another variant of the cap, the means for fastening the cap are two clip-fastening means received in internal edges delimiting the recess 70.

Figure 5:
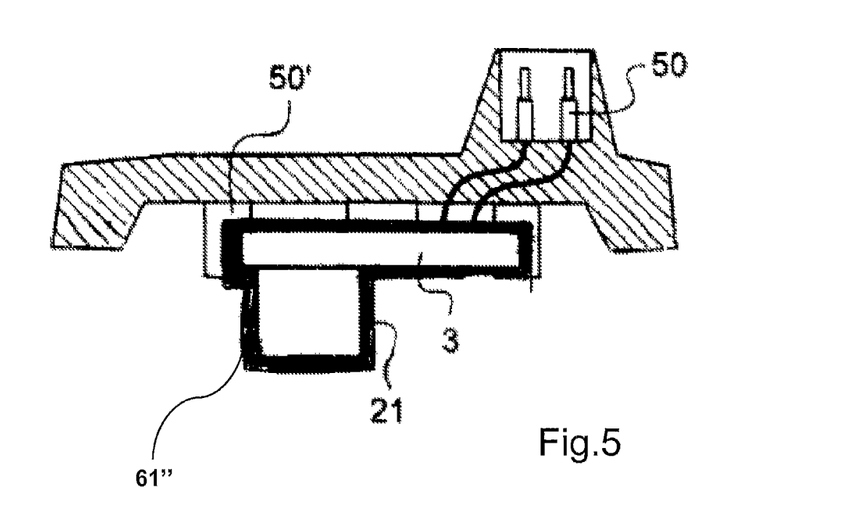
FIG. 5 represents a schematic view in section of a cap according to the invention.

The profiled support section 3 of the LEDs 2 is held by the cap, for example by fins or hooks 50' (cf. FIG. 5), holding the support with its potting 61".

The design of the cap thus permits integration of the diode array and also permits focusing of the array, that is to say good positioning of the array with respect to the injection side face.

The cap 4 may furthermore comprise surfaces or stops for referencing in the overmolding compartment.

Furthermore, the cap 4 is provided with a recess 50 (rendered leaktight by foam or a seal, etc.) for passage of the connection means, etc.

Diodes emitting white or colored light may be selected for ambient or reading lighting, etc.

Naturally, a plurality of supports may be provided on separate edges, and/or with separate functions (appropriate selection of the power, the light emitted, the position and the extent of the extraction regions).

The extraction, for example a scattering layer 12', may form ambient lighting.

The glazing unit 100 may, for example, form a fixed panoramic roof of a land vehicle, or as a variant of a boat, etc. The roof is mounted from the outside on the bodywork 90 by means of an adhesive 91.

The first pane is on the inside of the vehicle. The extraction is preferably through the face 12.

Figure 2:
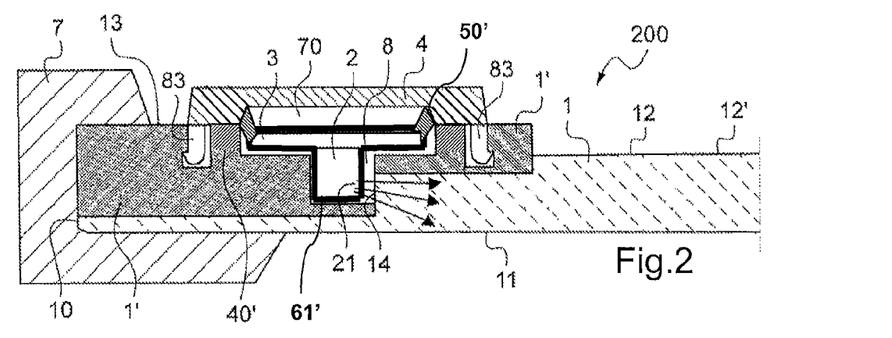

FIG. 2 represents a partial schematic view in cross section of a luminous glazing unit 200 for a vehicle in a second embodiment of the invention.

The luminous glazing unit 200 for a vehicle differs from the glazing unit 100 firstly by the arrangement of the fastening means 83, which are clipping means received in the first pane outside the recess 70 (surface 13 of the opaque region 1'), and the interfacial sealing element 5 is replaced with a varnish 61'.

For example, the glazing unit is provided with a polymeric overmolding 7, with a thickness of about 2.5 mm, at the border of the glazing unit, and preferably over the entire periphery of the glazing unit and of at least the second face 12.

The overmolding 7 is used in a conventional way for good esthetic finishing, and makes it possible to integrate other elements or functions (reinforcing inserts, etc.).

The overmolding 7 has, for example, a sealing lip between the glazing unit and the vehicle.

The overmolding 7 is for example made of black polyurethane, particularly of RIM-PU (Reaction Injection Molding).

Figure 3:
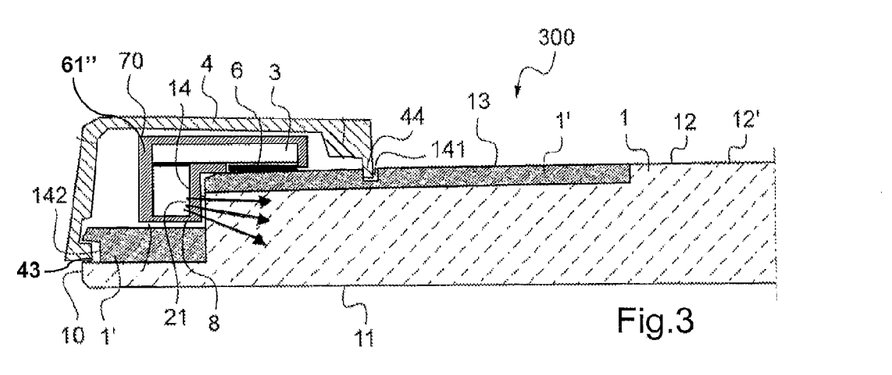

FIG. 3 represents a partial schematic view in cross section of a luminous glazing unit 300 for a vehicle in a third embodiment of the invention.

The luminous glazing unit 300 for a vehicle differs from the glazing unit 100 by:
- the extent of the recess 70, extending as far as the side face 10 and furthermore extending over the periphery of the first pane,
- by the optional use of a double sealing bead (recessed lower region and upper non-recessed region of the second face 12),
- the fastening means are reversible, comprising clip-fastening means with:
  - a first lug 44 in a first reception groove 141 on the second main face, for example the surface 13 of the opaque region 1',
  - and a second lug 43 in a second reception groove 142 on the side face, for example in the opaque region 1'.

Figure 4:
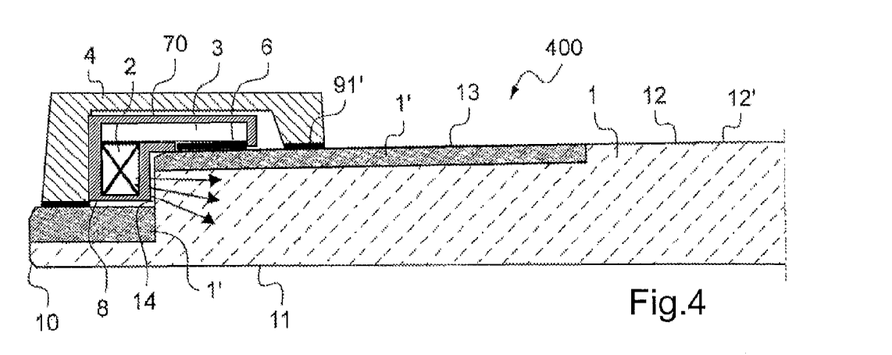

FIG. 4 represents a partial schematic view in cross section of a luminous glazing unit 400 for a vehicle in a fourth embodiment of the invention, in a variant of the glazing unit 300.

The double sealing bead is replaced with a reversible adhesive 91' or hook-and-loop fastener, and the cap 4 rests on the recessed part, for example the opaque region 1'. The recess 70 is a partial recess. The lateral ends may optionally be plugged with preferably reversible adhesive.

As a variant, the diodes are replaced with an optical fiber having a lateral emitting face, the fiber being placed (wedged) for example by a profiled support section on the second face. The primary light source may be a diode (not shown). For example, the 3M optical fiber named 3M™ Precision Lighting Elements is used.

As a variant, UV LEDs are selected, particularly in the UVA range, in order to excite luminescent materials on the face 12, for example, preferably for a glass pane.

The invention claimed is:

1. A luminous glazing unit for a vehicle, comprising:
    a first pane of mineral or organic glass having a first main face, a second main face and a side face forming an outer periphery of the first pane;
    a peripheral light source which has an emitting face and is formed by light-emitting diodes, each comprising a semiconductor chip on a profiled support section for supporting the diodes, the emitting face facing an edge of the second main face for propagation of injected visible and/or ultraviolet light in the thickness of the first pane, the first pane acting as a guide for the injected light, the edge of the second main face being different from the side face so that the peripheral light source is provided between the edge of the second main face and the side face, and the edge of the second main face being partly recessed or with a step;
    an arrangement for forming at least one luminous region comprising:
      a light extraction device for extracting the guided light via the first and/or second main face, the light extraction device including a scattering device on the surface of the first and/or second main face or scattering device in the volume of the first pane,
      and/or, when the injected light is ultraviolet light, a light converting device for converting the ultraviolet light into visible light via the first and/or second main face, which includes a luminescent material, and
    a cap covering the peripheral light source, which is leak-tight against one or more fluids, the cap essentially facing the second main face, and releasably connected by a fastener to the first pane or to a connecting piece bonded to the first pane or both to the first pane and the connecting piece, the cap and the profiled support section for supporting the diodes being removable from the glazing unit,
    wherein the profiled support section for supporting the diodes at least is provided with at least one moisture protection layer and/or an encapsulation.

2. The luminous gazing unit for a vehicle as claimed in claim 1, wherein the cap has an internal general face oriented toward the second main face and the cap is associated with an interfacial element for interfacial sealing against the one or more fluids, which is arranged between the cap and the connecting piece, or integrated into the connecting piece or integrated into the first pane or between the cap and the first pane.

3. The luminous glazing unit for a vehicle as claimed in claim 2, wherein the interfacial sealing element is a reversible adhesive forming part of or constituting said fastener, which is reversible.

4. The luminous glazing unit for a vehicle as claimed in claim 1, wherein the first pane is made of glass with a blind hole in its thickness from the second main face in order to accommodate the source facing the injection edge.

5. The luminous glazing unit for a vehicle as claimed in claim 4, wherein the glass is an organic glass.

6. The luminous glazing unit for a vehicle as claimed in claim 1, further comprising an element for masking the source and possible stray light, and/or for masking the fastening of the glazing unit to a bodywork of the vehicle by the second main face, the masking element being:
    a functional element part,
    and/or a sufficiently opaque enamel on the periphery of the second main face and/or on the first main face, or a face of a sheet film attached facing the first main face, and/or a reflective surface on the periphery of the second main face and/or on the first main face, or an attached face facing the first main face.

7. The luminous glazing unit for a vehicle as claimed in claim 6, wherein the functional element part is a polymeric encapsulation.

8. The luminous glazing unit for a vehicle as claimed in claim 6, wherein the functional element is single face or double face.

9. The luminous glazing unit for a vehicle as claimed in claim 1, wherein a space of the radiation emitted by the emitting face before injection is gaseous, local and at the periphery of the internal face of the cap or on a side of the cap.

10. The luminous glazing unit for a vehicle as claimed in claim 9, wherein the fastening of the source to the glazing unit is performed outside the space, and for the light-emitting diodes by the fastening of the profiled support section.

11. The luminous glazing unit for a vehicle as claimed in claim 9, wherein the fastening of the source to the glazing unit is carried out outside the space, outside the edge of the second main face and by the fastening of the profiled support section onto one of the faces of the first pane and/or onto the internal face of the cap.

12. The luminous glazing unit for a vehicle as claimed in claim 1, wherein the fastener is reversible, the fastener being selected from among:
   a clip-fastening device, arranged on the cap;
   a clip-fastening device forming an integral part of the cap;
   a screwing device.

13. The luminous glazing unit for a vehicle as claimed in claim 1, wherein the cap is an ornamentation, or the cap is masked after the glazing unit is fastened to a bodywork, the cap being along one or more edges or forming a frame.

14. The luminous glazing unit for a vehicle as claimed in claim 1, wherein the cap comprises a holder for holding said profiled support section and/or a recess for passage of an electrical connecting element and/or a positioning device for positioning the profiled support section for supporting the diodes.

15. The luminous glazing unit for a vehicle as claimed in claim 1, wherein the glazing unit is a single-glazing unit, the first pane being made of mineral or organic glass.

16. The luminous glazing unit for a vehicle as claimed in claim 1, wherein the at least one luminous region forms internal ambient lighting, internal reading lighting, or a luminous display for internal and/or external signaling.

17. The luminous glazing unit for a vehicle as claimed in claim 1, wherein the at least one moisture protection layer and/or an encapsulation is a varnish of the silicone, epoxy or acrylic.

18. The luminous glazing unit for a vehicle as claimed in claim 1, further comprising an attached peripheral functional element bonded to the first pane, which is leaktight against the one or more fluids and is selected from an overmolding or a prefitted element.

19. The luminous glazing unit for a vehicle as claimed in claim 18, wherein the cap is releasably connected by the fastener to the functional element.

20. The luminous glazing unit for a vehicle as claimed in claim 1, wherein the first pane includes an opaque region and wherein the cap is releasably connected to the opaque region by the fastener.

21. A luminous glazing unit for a vehicle, comprising:
   a first pane of mineral or organic glass having a first main face, a second main face and a side face;
   a peripheral light source which has an emitting face and is formed by light-emitting diodes, each comprising a semiconductor chip on a profiled support section for supporting the diodes, the emitting face facing an edge of the second main face for propagation of injected visible and/or ultraviolet light in the thickness of the first pane, the first pane acting as a guide for the injected light, the edge optionally being partly recessed or with a step;
   an arrangement for forming at least one luminous region comprising:
      a light extraction device for extracting the guided light via the first and/or second main face, the light extraction device including a scattering device on the surface of the first and/or second main face or scattering device in the volume of the first pane,
      and/or, when the injected light is ultraviolet light, a light converting device for converting the ultraviolet light into visible light via the first and/or second main face, which includes a luminescent material, and
   a cap covering the peripheral light source, which is leaktight against one or more fluids, the cap essentially facing the second main face, and secured by a fastener to the first pane or to a connecting piece bonded to the first pane or both to the first pane and the connecting piece, the cap and the profiled support section for supporting the diodes being removable from the glazing unit,
   wherein the profiled support section for supporting the diodes at least is provided with at least one moisture protection layer and/or an encapsulation,
   wherein the first pane is a transparent and opaque double material and an opaque region of the first pane lies on the periphery of the second main face and/or on the main first face, and wherein the light-emitting diodes lie in a hole or groove made in the opaque region of the first pane on the periphery of the second main face and the profiled support section bears in a recess, which is wider than the groove.

22. The luminous glazing unit for a vehicle as claimed in claim 21, wherein the hole is provided over the entire periphery of the second main face and the cap forms a frame.

23. A luminous glazing unit for a vehicle, comprising:
   a first pane of mineral or organic glass having a first main face, a second main face and a side face;
   a peripheral light source which has an emitting face and is formed by light-emitting diodes, each comprising a semiconductor chip on a profiled support section for supporting the diodes, the emitting face facing an edge of the second main face for propagation of injected visible and/or ultraviolet light in the thickness of the first pane, the first pane acting as a guide for the injected light, the edge optionally being partly recessed or with a step;
   an arrangement for forming at least one luminous region comprising:
      a light extraction device for extracting the guided light via the first and/or second main face, the light extraction device including a scattering device on the surface of the first and/or second main face or scattering device in the volume of the first pane,
      and/or, when the injected light is ultraviolet light, a light converting device for converting the ultraviolet light into visible light via the first and/or second main face, which includes a luminescent material, and
   a cap covering the peripheral light source, which is leaktight against one or more fluids, the cap essentially facing the second main face, and secured by a fastener to the first pane or to a connecting piece bonded to the first pane or both to the first pane and the connecting piece, the cap and the profiled support section for supporting the diodes being removable from the glazing unit, wherein the profiled support section for supporting the diodes at least is provided with at least one moisture protection layer and/or an encapsulation, wherein the first pane is made of organic transparent and opaque double material, and an opaque region of the first pane, on the periphery of the second main face and/or on the first main face, forms masking of the source and possible stray light, and/or forms masking of the fastening of the glazing unit to a bodywork of the vehicle by the second main face.

24. A luminous glazing unit for a vehicle, comprising:

a first pane of mineral or organic glass including a first main face, a second main face and a side face forming an outer periphery of the first pane;

a peripheral light source having a radiation emitting face and including a plurality of light-emitting diodes arranged on a diode support, the emitting face of the light source facing an edge of the second main face so that, in use, radiation emitted by the light source enters the edge of the second main face and propagates in the thickness of the first pane, the first pane acting as a guide for the radiation propagating in the first pane, the edge of the second main face being different from the side face so that the peripheral light source is provided between the edge of the second main face and the side face, and an arrangement for forming a luminous region in the unit, the arrangement comprising:

scattering elements provided on the surface of the first and/or second main face or in a volume of the first pane, and/or, when the radiation is ultraviolet radiation, a luminescent material for converting the ultraviolet radiation into visible light, and a cap covering the peripheral light source, the cap being leaktight against one or more fluids and essentially facing the second main face, and releasably connected by a fastener to (a) the first pane, or to (b) a connecting piece bonded to the first pane or to (c) both the first pane and the connecting piece, the cap and the diode support being removable from the glazing unit, wherein the diode support is provided with at least one moisture protection layer and/or an encapsulation.

25. The luminous glazing unit for a vehicle as claimed in claim 24, further comprising an attached peripheral overmolding or a prefitted element bonded to the first pane, which is leaktight against one or more fluids.

26. The luminous glazing unit for a vehicle as claimed in claim 25, wherein the cap is releasably connected by the fastener to the attached peripheral overmolding or prefitted element.

27. The luminous glazing unit for a vehicle as claimed in claim 24, wherein the first pane includes an opaque region and wherein the cap is releasably connected to the opaque region by the fastener.

* * * * *